United States Patent Office 3,574,832
Patented Apr. 13, 1971

3,574,832
THERAPEUTIC HEPARIN-SURFACTANT COMPOSITIONS
Robert Henry Engel and Stephen Joseph Riggi, Suffern, N.Y., assignors to American Cyanamid Company, Stamford, Conn.
No Drawing. Filed May 29, 1968, Ser. No. 732,855
Int. Cl. A61k 17/18
U.S. Cl. 424—183       5 Claims

ABSTRACT OF THE DISCLOSURE

A composition capable of absorption through the walls of the alimentary canal and producing heparin-like effects, comprising heparin and more than about .001 part by weight per part of heparin of a surfactant selected from the group consisting of sodium lauryl sulfate, dioctyl sodium sulfosuccinate, sodium hexyl sulfate, sodium lauryl sulfonate, sodium cetyl sulfonate and mixtures thereof.

---

This invention relates to novel heparin compositions which can be effectively aministered orally or rectally. More particularly, this invention relates to novel compositions comprising heparin and at least one of a selected class of synthetic surfactants. It relates further to a method of obtaining effective heparin blood levels by the administration of the heparin composition of this invention via a route involving absorption through the walls of the alimentary canal.

Heparin is a polysaccharide which occurs naturally in mammals and functions to maintain the fluidity of blood. Heparin concentrates for medical use are usually obtained from liver or lung tissue of stock animals, and are marketed in final therapeutic form as solutions of the heparin sodium salt. Heparin treatment is indicated where it is desirable to retard the coagulation of blood, and reduce hperlipemia. It is presently administered parenterally and never orally since it has proved ineffective by this route. It is theorized that the inactivity is due to either degradation by gastric and intestinal fluids, or poor absorption through the alimentary canal walls.

Parenteral administration of medicinal compounds is generally regarded as being undesirable since it is cumbersome and painful and requires trained personnel and sterile conditions at the sites of treatment. It is preferred to administer medicinal compounds orally since it can be easily and quickly accomplished without the need for special personnel or apparatus. Thus, there is a present need to provide a means which permits the administraion of heparin compositions with satisfactory therapeutic effects without the need for parenteral administration.

It is an object of the present invention to provide heparin compositions which provide satisfactory therapeutic activity in mammals when introduced via the alimentary canal. It is a further object of the present invention to provide herparin compositions which produce satisfactory therapeutic effects when orally administered to mammals. Further objects of the present invention will become evident in view of the following detailed discussion.

The present invention resides in the discovery that mixtures comprising heparin and a sulfated or sulfonated surfactant of the group comprising sodium lauryl sulfate, dioctyl sodium sulfosuccinate, sodium hexyl sulfate, sodium lauryl sulfonate, sodium cetyl sulfonate, or mixtures thereof, are capable of being absorbed by the alimentary canal of mammals and affording parmacologically effective heparin blood levels.

It is indeed surprising that the compositions of this invention are effective when introduced into the alimentary canal. It has been found that when other sulfated or sulfonated surfactants closely related to those set forth above are employed, such as sodium cetyl sulfate or sodium hexyl sulfonate, the resulting composition is ineffective for supplying heparin to the blood stream when introduced into the alimentary canal at similar doses. Furthermore, these compositions are effective when mixed with water in amounts normally present in the alimentary canal, without the need for additional solutes, vehicles or dispersants.

The heparin and surfactant are employed with effectiveness in compositions containing at least about .001 part by weight of surfactant per part of heparin. The surfactant can constitute a large proportion of the composition, e.g. up to ninety or more weight percent and the composition will exhibit heparin-like activity. However, it is evident that surfactant-rich compositions will require larger dosages to achieve given heparin levels than will compositions richer in heparin. Therefore, in terms of absorbability and practical dose size, compositions comprising the surfactant in an amount of between about .001 and about 1 part by weight per part of heparin are preferred. Surprisingly, it has been found that the concentrations of heparin and surfactant are complementary in that equal effectiveness can be obtained by reducing either the heparin or surfactant concentration and increasing the concentration of the other component by the same amout within the foregoing framework. In use, the composition of the present invention may be mixed with sufficient water to form a solution thereof. The use of water is not a critical part of this invention.

The compositions of this invention can be administered oraly, intraduodenally or rectally to warm blooded animals. Thus, the compositions of this invention can be formed into tablets, capsules, granules or suppositories when combined with physiologically acceptable carriers, binders, or diluents. The compositions can also be administered in the form of aqueous solutions, suspensions, as well as elixers and similar pharmaceutical vehicles or carriers. For oral administration, the compositions of this invention are coated with an enteric coating such as cellulose acetate, phthalate, styrene-maleic anhydride copolymers, and the like ot prevent or minimize degradation of the heparin by gastric juices.

The novel compositions of the present invention may optionally include such materials as preservatives, excipients, buffers, fillers, sweeteners, extenders and the like. Furthermore, these compositions may be modified to include medicinal compounds such as vitamins, antibiotics and compounds which are normally characterized by poor absorption through the alimentary canal wall including vitamin $B_{12}$ and iron salts such as ferrous sulfate, ferrous fumarate and ferrous gluconate.

The effectiveness of the compositions of the present invention depends upon various factors including age, sex, weight, physical condition of the treated animal. Usually, in practice the composition is given preliminarily in small dosages and then in increasingly larger doses until satisfactory effectiveness is obtained without significant side effects. Normally the dosage employed will be in the range of from about 20 to about 200 milligrams of heparin per kilogram and at a frequency of one to three times per day. These variables can be adjusted to the needs of the patient by the use of gradually increasing dosages. In this instance the determination of the dosage is usually based in part on the propensity of the patients blood to coagulate and the magnitude of the clearing factor response elicited.

The effect of heparin in mammals in the following examples is determined by performing a clearing factor assay on blood samples as hereinafter described. Blood samples are withdrawn by heart puncture, for both the treated and control groups, 30 minutes after administration.

The optical density assay of post-heparin clearing factor is carried out in the following manner: The blood samples obtained by heart puncture are placed in ice cold 12 ml. centrifuge tubes. The tubes are centrifuged and the supernatant plasma is withdrawn as needed. The assay is carried out in a 1 ml. Coleman spectrophotomer cuvette. Exactly 0.6 ml. of 0.05 M tris(hydroxymethyl) aminomethane buffer solution, pH 8.5, 0.3 ml. of 25% w./v. plasma albumin, pH 8.5 and 0.5 ml. of post heparin plasma are added to the cuvette and mixed thoroughly. The optical density is then recorded in a suitable spectrophotomer at 650 m$\mu$. This value represents the enzyme blank and is the limiting value to which the optical density can fall after the addition of the substrate. The mixture is then pre-incubated for 2 minutes at 37° C. and 0.1 ml. of 6% Ediol, a lipid emulsion consisting of a 50% coconut oil and 12.5% sucrose, marketed by Riber Laboratories, is added and mixed thoroughly. The $T_O$ optical density, which will be about 0.8, is immediately recorded. The mixture is then incubated at 37° C. and readings are taken every 10 to 15 minutes for one hour. The data are plotted as either optical density or the change of optical density with time. Substrate controls rarely fall by more than 0.03 unit.

EXAMPLE 1

Normal, male rats were administered the compositions detailed in Table I by introduodenal intubation. Blood samples were withdrawn after 30 minutes. The blood was centrifuged and the serum assayed for clearing factor activity by the procedure described above. A decrease in optical density at 650 m$\mu$ of the respective samples indicates clearing factor activity and is evidence of heparin absorption. Table I summarizes the response of various compositions with rats as measured by the above procedure. As shown in Table I, compositions containing a combination of heparin and sodium lauryl sulfate or heparin and dioctyl sodium sulfosuccinate were absorbed by the rat in significant amounts. Compositions not containing either a sulfated or sulfonated surfactant or heparin did not show any clearing factor activity.

EXAMPLE 2

Following the procedure set forth in Example 1, the compositions set forth in Table II were administered intraduodenally to normal male rats previously fasted for 18 hours.

TABLE II

| Treatment | Heparin dosage mg./kg. | Decrease in optical density (650 m$\mu$) Incubation time [1] | |
|---|---|---|---|
| | | 15 minutes | 30 minutes |
| 0.5% aqueous solution of sodium lauryl sulfate plus Heparin | 100 | 0.30±0.06 | 0.43±0.08 |
| Sodium lauryl sulfate (5 ml./kg.) | | 0.03±0.00 | 0.03±0.01 |
| Heparin plus 0.5 aqueous solution of dicotyl 100 sodium sulfosuccinate (5 ml./kg.) | 100 | 0.24±0.05 | 0.38±0.05 |
| Dicotyl sodium sulfosuccinate (5 ml./kg.) | | 0.03±0.00 | 0.03±0.00 |
| Aqueous heparin (5 ml./kg.) | 100 | 0.03±0.00 | 0.04±0.00 |

[1] Values and means±standard errors of 8 rats/group and are expressed as change in optical density after 15 or 30 minutes incubation. Initial mean optical density was 0.75.

As shown in Table II, compositions containing heparin and sodium lauryl sulfate or dioctyl sodium sulfosuccinate all show significant absorption in the rat. Compositions not containing a sulfated or sulfonated surfactant did not show any absorption in the rat as measured by clearing factor activity.

EXAMPLE 3

Normal male dogs were administered the compositions set forth in Tables III, IV and V by intraduodenal intubation. Blood samples were withdrawn at the times indicated and tested for clearing factor activity in accordance with the procedure set forth above. The clearing factor activities are set forth in Tables III and V. Blood samples were also tested for Heparin–35S by radioactivity, the results of which are set forth in Table IV. The number of dogs tested for each composition is shown in parenthesis. As shown in Tables II, IV and V the compositions containing heparin and sodium lauryl sulfate promote effective absorption of heparin through the alimentary canal. Compositions not containing either a sulfated or sulfonated surfactant or heparin do not show any clearing factor activity.

TABLE I

| Composition | Heparin dosage (mg./kg.) | No. of rats | Mean Decrease in Optical density (reading at 650 m$\mu$±S.E.) | |
|---|---|---|---|---|
| | | | After 15 min. | After 30 min. |
| 1% aqueous solution of sodium lauryl sulfate containing 10 or 20 mg. heparin/ml | 100 | 10 | 0.24±0.04 | 0.37±0.04 |
| 1% sodium solution of sodium lauryl sulfate | | 12 | 0.01±0.01 | 0.01±0.00 |
| 0.5% aqueous solution of dioctyl sodium sulfosuccinate containing 40 mg.heparin/ml | 200 | 5 | 0.17±0.02 | 0.30±0.06 |
| 0.5% aqueous solution of dioctyl sodium sulfosuccinate | | 8 | 0.00±0.00 | 0.00±0.00 |
| Aqueous solution of heparin containing 10 mg. heparin/ml | 100 | 12 | 0.03±0.00 | 0.03±0.00 |

TABLE III.—APPEARANCE OF CLEARING FACTOR ACTIVITY IN THE DOG FOLLOWING INTRADUODENAL ADMINISTRATION OF HEPARIN AND SODIUM LAURYL SULFATE

| Treatment | Decrease in optical density [1] (650 m$\mu$) at— | | | |
|---|---|---|---|---|
| | 0 min. | 30 min. | 60 min. | 90 min. |
| 1. Heparin–35S plus sodium lauryl sulfate [2] | 0.01±0.00 (3) | 0.26±0.05 (4) | 0.29±0.04 (4) | 0.24±0.04 (4) |
| 2. Heparin–35S [2] | 0.03±0.00 (4) | 0.06±0.01 (4) | 0.04±0.00 (4) | 0.04±0.02 (3) |
| 3. Sodium lauryl sulfate | 0.01±0.01 (3) | 0.00±0.01 (3) | 0.00±0.01 (3) | 0.00±0.01 (3) |
| 4. Saline | −0.01 (1) | 0.01 (1) | −0.01 (1) | 0.01 (1) |

[1] Reported as decrease in optical density at 15 minutes assay time. Errors are expressed as S.E.M.

[2] Heparin solutions were administered at a dose of 100 mg. heparin/kg. body weight in a volume of surfactant solution (0.5% in water) of 5 ml./kg. (25 mg. SLS/kg.). Heparin-35S was administered at a dose of 7 uc/kg. All solutions were adjusted to pH 6.5 before administration.

TABLE IV.—APPEARANCE OF HEPARIN IN THE SYSTEMATIC BLOOD OF THE DOG FOLLOWING INTRADUODENAL ADMINISTRATION OF HEPARIN AND SODIUM LAURYL SULFATE

| Treatment | μg. Heparin/ml. serum | | | |
|---|---|---|---|---|
| | 0 min. | 30 min. | 60 min. | 90 min. |
| 1. Heparin plus sodium lauryl sulfate | 0.3±0.2 (3) | 13.6±2.8 (4) | 16.0±1.8 (4) | 14.6±2.5 (4) |
| 2. Heparin | 0 | 1.4±0.4 (2) | 2.0±0.3 (2) | 2.2±2.0 (2) |

TABLE V.—APPEARANCE OF CLEARING FACTOR ACTIVITY IN THE DOG FOLLOWING INTRADUODENAL IMPLANTATION OF GELATIN CAPSULES CONTAINING HEPARIN AND SODIUM LAURYL SULFATE

| Treatment | Time (hrs.) | | | | | |
|---|---|---|---|---|---|---|
| | 0 | 0.5 | 1 | 2 | 3 | 4 |
| 1. Heparin plus sodium lauryl sulfate | [1] 0.02±0.00 | 0.10±0.01 | 0.15±0.03 | 0.24±0.06 | 0.23±0.07 | 0.23±0.08 |
| 2. Heparin | 0.02±0.00 | 0.03±0.02 | 0.08±0.03 | 0.07±0.04 | 0.03±0.01 | 0.02±0.01 |

[1] 4 dogs/group. Data is expressed as the decrease in optical density (650 mμ) at 15 minutes assay time±S.E.M. Heparin, 100 mg./kg.; SLS, 25 mg./kg.; 6-8 capsules/dog. Implantation was accomplished by means of a glass tube inserted directly into the duodenum immediately distal to the gyloric sphincter through an incision in the stomach.

EXAMPLE 4

This example is presented to show the effectiveness of compositions containing sodium hexyl sulfate, sodium lauryl sulfonate and sodium cetyl sulfonate and the ineffectiveness of sodium cetyl sulfate and sodium hexyl sulfonate. The compositions shown in Table VI were each administered to rats by intraduodenal intubation. Samples were obtained and tested in a manner described in Example 1. The results are shown in Table VI. A decrease in optical density of 0.06 is considered significant.

TABLE VI

| Composition | Heparin dosage, mg./kg. | Decrease in optical density at 30 min. | Percent animals responding [1] |
|---|---|---|---|
| Aqueous solution of 1.5% sodium hexyl sulfate and heparin | 100 | [2] 0.11±0.04 | 38 |
| Aqueous solution of <.106 sodium lauryl sulfonate and heparin [3] | 100 | 0.06±0.01 | 38 |
| Aqueous solution of <.106 sodium cetyl sulfonate and heparin [3] | 100 | 0.06±0.01 | 50 |
| Aqueous solution of 1.5 sodium cetyl sulfate and heparin | 100 | 0.06±0.01 | 50 |
| Aqueous solution <.106% sodium hexyl sulfonate and heparin [3] | 100 | 0.04±0.01 | 0 |
| | 100 | 0.04±0.00 | 0 |

[1] 8 rats per group.
[2] Values are expressed as means ±S.E.M.
[3] Sodium lauryl sulfonate, sodium hexyl sulfate and sodium cetyl sulfonate were administered in saturated solutions.

What is claimed is:
1. A composition capable of absorption through the walls of the alimentary canal upon oral administration and producing heparin-like effects, consisting essentially of heparin and more than about .001 part by weight per part of heparin of a surfactant selected from the group consisting of sodium lauryl sulfate, dioctyl sodium sulfosuccinate, sodium hexyl sulfate, sodium lauryl sulfonate, sodium cetyl sulfonate and mixtures thereof.
2. The composition of claim 1 in which the surfactant is sodium lauryl sulfate.
3. The composition of claim 1 wherein the surfactant is dioctyl sodium sulfosuccinate.
4. The composition of claim 1 containing between .001 and 1 part of the surfactant per part of heparin.
5. The composition of claim 1 in dosage unit form.

References Cited

UNITED STATES PATENTS 3,088,868   5/1963   Windsor _____ 424—183

OTHER REFERENCES

Chemical Abstracts, vol. 61, entry 7567f, 1964, citing Gianni, Minerva Med., 55(11), 329–32 (1964). Copy of Chem. Abst. in POSL.

RICHARD L. HUFF, Primary Examiner